United States Patent [19]

Kincheloe et al.

[11] 4,377,251

[45] Mar. 22, 1983

[54] VARIABLE GEOMETRY VACUUM COLUMN

[75] Inventors: David W. Kincheloe, West Chicago; David O. Neathery, St. Charles, both of Ill.

[73] Assignee: King Instrument Corporation, Westboro, Mass.

[21] Appl. No.: 195,345

[22] Filed: Oct. 8, 1980

[51] Int. Cl.³ .................. B65H 23/08; G11B 15/58
[52] U.S. Cl. ............................ 226/195; 226/118; 242/75.3; 242/182
[58] Field of Search .................. 242/182-185, 242/75.3; 226/195, 95, 97, 118; 73/37

[56] References Cited

U.S. PATENT DOCUMENTS

| | | | |
|---|---|---|---|
| 3,156,109 | 11/1964 | Fieldgate | 73/37 |
| 3,156,423 | 11/1964 | Potter et al. | 242/185 |
| 3,223,338 | 12/1965 | Takeuchi | 242/185 |
| 4,218,026 | 8/1980 | Stange | 242/55 |

Primary Examiner—Leonard D. Christian
Attorney, Agent, or Firm—Schiller & Pandiscio

[57] ABSTRACT

A tension regulator for magnetic recording tape, which comprises a plurality of side members forming an encased columnar space having an open top for receiving a flexible tape loop. One of the side members is adjustably positionable relative to the other side member for changing the cross-sectional area of the columnar space in order to vary the tension applied to the flexible tape being received by the tension regulator.

11 Claims, 3 Drawing Figures

U.S. Patent  Mar. 22, 1983  4,377,251
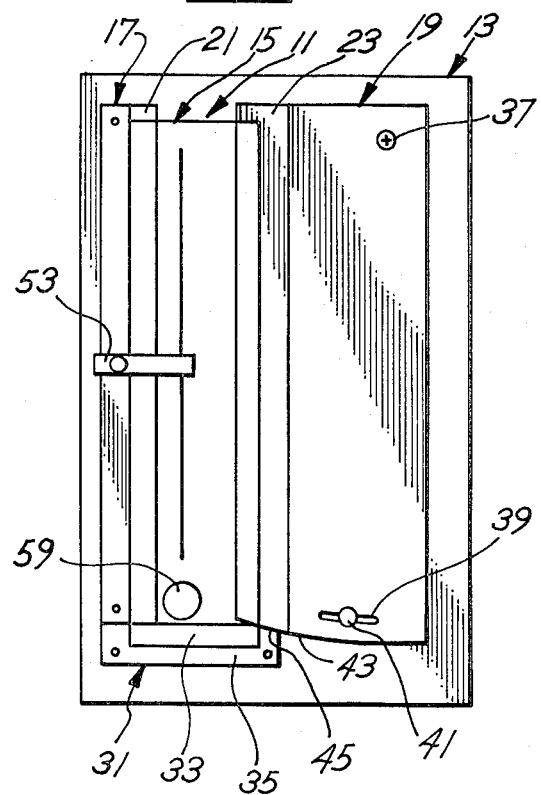
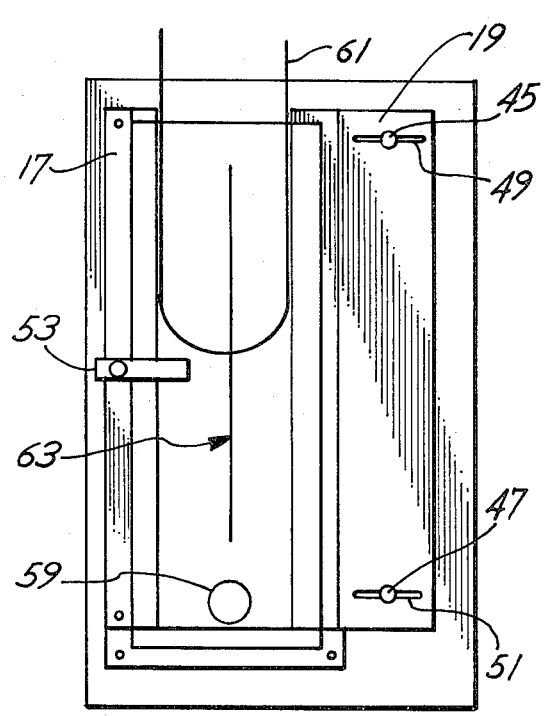
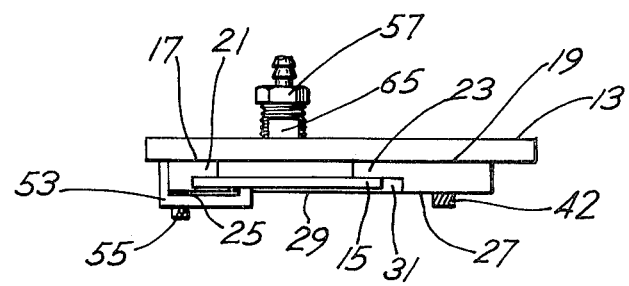

VARIABLE GEOMETRY VACUUM COLUMN

RELATED PATENT APPLICATIONS

This application is related to the following two U.S. patent applications filed on even date herewith: (1) Ser. No. 199,924, entitled Flexible Tape Control Apparatus, by David W. Kincheloe and David O. Neathery; and (2) U.S. Pat. No. 4,341,362 entitled Anticipating Servo Controller For Controlling Magnetic Tape Movement In A Tape Cassette Loader, by David O. Neathery and Edward J. Riggs.

BACKGROUND OF THE INVENTION

The invention relates to apparatus for controlling the tension placed on a flexible tape, and more particularly relates to a vacuum column tension regulator for use in a tape cassette loader for controlling the tension applied to the magnetic tape during loading of tape into cassettes.

In the art of tape cassette loading, a predetermined length of tape is paid out from a spool and taken up and loaded within a tape cassette. Such cassette loaders include a single source of tension regulating the tension between the supply spool and the spool of the tape cassette. See for example U.S. Pat. No. 3,753,834 issued to James L. King on Aug. 21, 1973.

A vacuum column is an ideal tension regulating device for magnetic recording tapes or other flexible type tapes. Generally for a given vacuum column of a predetermined cross-sectional area, the quantity of vacuum pressure presented to the column determines the extent of tension placed on the tape. Thus, the vacuum pressure is regulated in order to regulate the extent of tension supplied by the column. However, where more than one vacuum column is utilized within a given tape path, a plurality of vacuum sources would be necessary in order to adjust each separate vacuum source to provide different tensions with respect to each vacuum column.

Therefore, it is highly desirable to provide a single vacuum source in which the vacuum tension is quickly and easily adjustable for providing a selected tension level, without the need to adjust the pressure of the vacuum supplied to the column.

SUMMARY OF THE INVENTION

A flexible tape tension regulator includes a plurality of side portions forming an encased columnar space in which one side portion is adjustably positionable for varying the cross-sectional area of the columnar space to effect tension change.

BRIEF DESCRIPTION OF THE DRAWINGS

FIG. 1 is a front elevation of a vacuum column having a manually adjustable tension regulation, as a preferred embodiment of the present invention.

FIG. 2 is a front elevation of a second embodiment of the vacuum tension regulator of FIG. 1.

FIG. 3 shows a top view of the tension regulator of FIG. 1.

DESCRIPTION OF THE PREFERRED EMBODIMENT

Referring to FIG. 1, a vacuum column 11 is formed from a flat, planar, back member 13 and a front, planar, glass member 15 disposed in parallel planes and face confronting relationship. A pair of side members 17, 19 are sandwiched between back and front members 13, 15 in a spaced-apart relationship for defining vacuum column 11. Side members 17, 19 include respective cut away portions or grooved plateaus 21, 23 which lie between the planes of the front and back members. As illustrated in FIG. 3, the plateaus are cut to a depth to permit the outer surfaces 25, 27 of respective members 17, 19 to lie flush with the outside surface 29 of front member 15 as shown.

A bottom member 31 forms the bottom of the vacuum column and is rigidly secured to back member 13. Bottom member 31 includes a grooved plateau portion 33 which is sandwiched between members 13, 15 such that surface 29 (FIG. 3) of front member 15 lies flush with the non-grooved surface 35 of bottom member 31.

Side member 17 is rigidly secured to back member 13 whereas side member 19 is adjustably mounted to back member 13 for permitting manual positioning of side member 19 relative to the back member in order to vary the cross-sectional area of the columnar space of the vacuum column.

Side member 19 is rotatably mounted on a bearing rod 37 for sliding movement between members 13, 15. A slot 39 is formed in the lower portion of side member 19 for receiving a guide rod 41 which is connected to back member 13 and protrudes through slot 39 as shown. Rod 37 includes a cylindrical bearing surface for permitting rotation of member 19 and includes a threaded top portion for receiving a threaded knob 42. Knob 42 is manually tightening for securing side member 19 against back member 13 for fixing the cross-sectional area of the columnar space. Side member 19 includes a curved lower surface 43 for mating with a curved surface 45 formed in bottom member 31, for providing a closed boundary between members 19 and 31 as side member 19 is adjusted to different positions.

Referring to FIG. 2, a vacuum column similar to FIG. 1 is illustrated in which side member 19 is slidably mounted on a pair of spaced-apart rods 45, 47 via a pair of slots 49, 51 formed in side member 19, for maintaining side member 19 in a substantially parallel relationship with respect to side member 17. Slots 49, 51 serve to keep member 19 at a vertical height relative to back member 13 and to control the minimum and maximum spacing of members 17, 19. Both rods 45, 47 include threaded top portions for receiving threaded knobs for manual manipulation, to permit the operator to slide member 19 into a desired position and then to fix member 19 securely with respect to member 17.

As illustrated, glass front member 15 is held in contact with plateau portions 21, 23, 33 of members 17, 19, 31 by a securement device 53. As seen in FIG. 3, securement device 53 is pressed against glass member 15, by a threaded knob 55 which is screwable onto a threaded bolt (not Shown) which passes through device 53 and is held by side member 17. The operator has access to the vacuum column by unscrewing the threaded knob 55, removing device 53 from the threaded bolt and removing glass front member 15 from plateau portions 21, 23, 33.

A vacuum fitting 57 is illustrated in FIG. 3, for supplying vacuum to column 11 via opening 59 formed in back member 13 at the bottom of the column. When vacuum is applied, a loop of magnetic tape 61 (FIG. 2) is sucked within the column at a predetermined tension. As side member 19 is adjusted in position relative to side member 17, the tension on tape 61 varies. The front and back members 15 and 13 are spaced apart at a distance somewhat greater than the width of the tape to permit free movement of the tape within the column while providing a vacuum pressure beneath the tape loop.

In order to monitor the movement of the tape within the vacuum column, a tape length sensor 63 (FIG. 2) is utilized to monitor tape length. Tape length sensor 63 includes a slit running the substantial length of the vacuum column and is enclosed on the back side of the column by a small encased housing 65 (FIG. 3) forming a small cavity running the length of the slit. A pressure sensor (not shown) is located at the back side of housing 65 for monitoring the pressure within the cavity of the housing. As the tape loop moves up and down within the vacuum column, the pressure monitored by the sensor will vary in accordance with the length of the loop within the column. That is, atmospheric pressure will exist above the tape loop and vacuum pressure will exist below the tape loop within the vacuum column and thus effect the pressure in housing 45 via the slit, in accordance with the position of the loop within the column.

It should be understood of course that the foregoing disclosure relates to preferred embodiments of the invention and that modifications or alterations may be made in such embodiments without departing from the spirit or scope of the invention as set forth in the appended claims.

What is claimed is:

1. For use in a tape cassette loader, a flexible tape tension regulator comprising a vacuum column having a back member, a front member, a first side member, a second side member and a bottom member, forming an encased columnar space having an open top for receiving a flexible tape, at least one of said first and second side members being adjustably positionable relative to the other of said first and second side members for varying the cross-sectional area of said columnar space; means for releasably securing said at least one side member against movement so as to fix said cross-sectional area, vacuum means for providing vacuum communication with said columnar space; and a tape length sensor for monitoring the length of a loop of said flexible tape in said columnar space, said tape length sensor comprising aperture means providing communication with said columnar space along a line running lengthwise of said columnar space.

2. For use in a tape cassette loader, a flexible tape tension regulator comprising a vacuum column having a back member, a front member, a first side member, a second side member and a bottom member, said members forming an encased columnar space having an open top for receiving a flexible tape, said back member having two elongate rods attached thereto, and projecting forwardly through two elongate slots in said second side member, said second side member being slidably mounted to said back member by said rods so as to be adjustable relative to said first side member for varying the cross-sectional area of said columnar space; vacuum means for providing communication with said columnar space; and a tape length sensor for monitoring the length of a loop of said flexible tape in said columnar space, said tape length sensor comprising aperture means providing communication with said columnar space along a line running lengthwise of said columnar space.

3. A tension regulator according to claim 2 and further including manual securement means adjustably controllable for permitting free sliding movement of said second side member and controllable for securing said second side member in a fixed relationship relative to said first side member.

4. A tension regulator according to claim 3 wherein said second side member includes slot means formed in said second side member; and said back member including bearing surface means for cooperating with said slot means for controlling movement of said second side member.

5. For use in a tape cassette loader, a flexible tape tension regulator comprising a vacuum column having a back member, a front member, a first side member, a second side member and a bottom member, forming an encased columnar space having an open top for receiving a flexible tape, said back member being parallel to and in spaced confronting relation with said first member, said back member having an elongate rod attached thereto, said rod projecting from the front of said back member through a bore in said second side member, said second side member being rotatably and adjustably mounted to said back member by said rod for movement between said front member and said back member relative to said first member for varying the cross-sectional area of said columnar space; vacuum means for providing vacuum communication with said columnar space; and a tape length sensor for monitoring the length of a loop of said flexible tape in said columnar space, said tape length sensor comprising aperture means providing communication with said columnar space along a line running lengthwise of said columnar space.

6. A tension regulator according to claim 5 wherein said first side member, said second side member and said bottom member include plateau portions for providing a surface for contacting said front member; and securement means for securing said front member against said plateau portions.

7. A tension regulator according to claim 6 wherein said securement means is manually adjustable for releasing the contact pressure between said front member and said plateau portions.

8. A tension regulator according to claim 7 wherein said front member is removable from said plateau portions.

9. For use in a tape cassette loader, a flexible tape tension regulator comprising in combination:

a vacuum column having a back member, a front member, a first side member, a second side member, and a bottom member, wherein (a) all five said members form an encased columnar space having an upper end, a lower end, and an open top for receiving a flexible tape, (b) said second side member is adjustably positionable relative to said first side member so as to allow the cross-sectional area of said columnar space to be varied, and (c) said first side member, said second side member, and said bottom member have plateau portions providing a contact surface for said front member;

first manual securement means for securing said front member against said plateau portions, said securement means being adjustable so as to allow said front member to be removed from said plateau portions;

second manual securement means for securing said second side member to said back member after said second side member has been adjusted to the desired position;

vacuum means for providing communication between a vacuum source and said columnar space, said vacuum means being connected near the lower end of said columnar space; and a tape length sensor for monitoring the length of a loop of flexible tape formed in said columnar space.

10. A tension regulator according to claim 9 wherein said tape length sensor comprises in combination:

a housing on the rear side of said back member, said housing extending substantially along the length of said vacuum column;

a slit penetrating said back member, said slit extending lengthwise of said vacuum column and providing communication between said vacuum column and said housing for substantially the entire length of said vacuum column; and at least one pressure sensor connected to said housing for measuring the pressure within said housing as affected by the length of the tape loop within the vacuum column.

11. A tension regulator according to claim 1 wherein said aperture means comprises an elongate opening in the back side of said columnar space.

* * * * *